July 23, 1957     G. W. WOLCOTT     2,800,344
CONNECTORS FOR METAL TUBING OF DIFFERENT MATERIALS
Filed Dec. 16, 1953     2 Sheets-Sheet 1
FIG-1
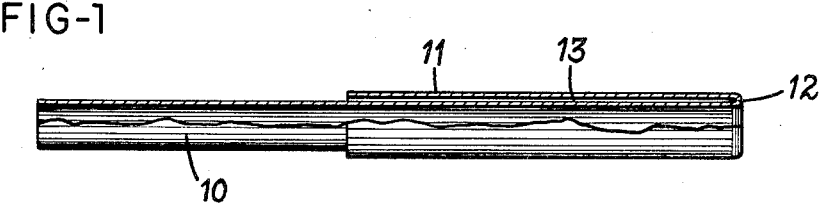
FIG-2
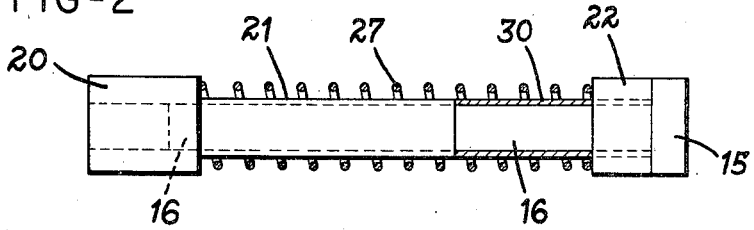
FIG-3
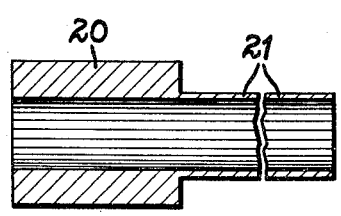
FIG-4
FIG-5
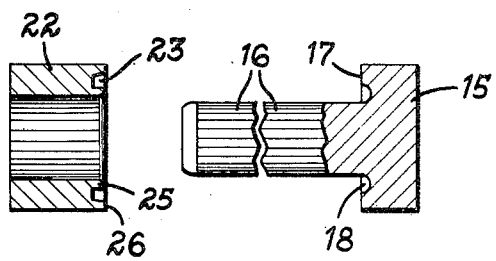
FIG-6
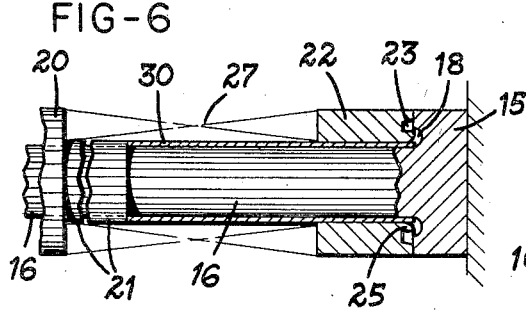
FIG-7
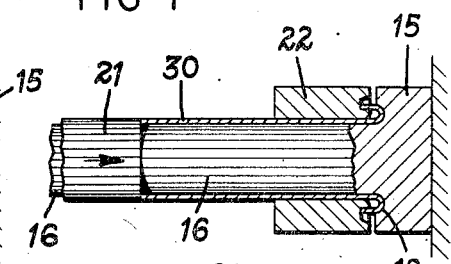
FIG-8
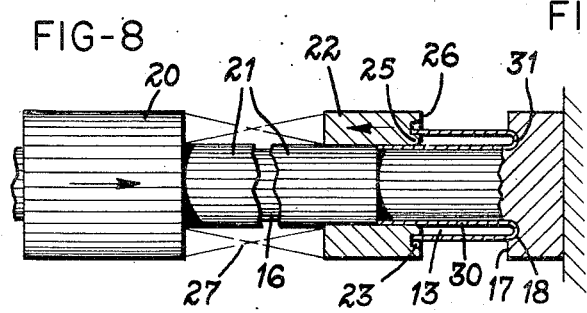
FIG-9
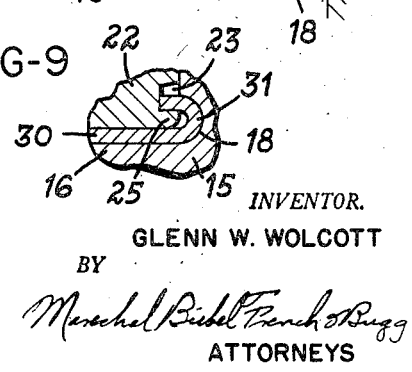
INVENTOR.
GLENN W. WOLCOTT
BY
Marschel Biebel French & Bugg
ATTORNEYS July 23, 1957  G. W. WOLCOTT  2,800,344
CONNECTORS FOR METAL TUBING OF DIFFERENT MATERIALS
Filed Dec. 16, 1953  2 Sheets-Sheet 2

*INVENTOR.*
GLENN W. WOLCOTT
BY
*Marechal Biebel French & Bugg*
ATTORNEYS

United States Patent Office 2,800,344
Patented July 23, 1957

2,800,344

CONNECTORS FOR METAL TUBING OF DIFFERENT MATERIALS

Glenn W. Wolcott, Dayton, Ohio, assignor to Penn Aircraft Products, Inc., Dayton, Ohio, a corporation of Ohio Application December 16, 1953, Serial No. 398,485

3 Claims. (Cl. 285—173)

This invention relates to the fabrication of metal tubing, and more particularly to a method and apparatus for turning a metal tube outside-in and to products produced thereby, especially to connectors for use in joining lengths of metallic tubing.

One of the primary objects of the invention is to provide a method and apparatus by means of which a cylindrical metal tube can be turned outside-in over any desired portion of the total length thereof with resulting increase or decrease of the diameter of the tube while maintaining substantially a uniform cylindrical configuration over both the tube portion of initial diameter and that of the final diameter, and wherein tubing parts so formed are combined to provide connectors for use in joining lengths of metallic tubing.

It is a further object of the invention to provide, by means of such method and apparatus, improved connectors for the formation of a permanently sealed joint between two metal tubes of different metals having materially different melting points such, for example, as aluminum and copper or steel.

Other objects and advantages will be apparent from the following description, the accompanying drawings and the appended claims.

In the drawings—

Fig. 1 is a detail view partly in side elevation and partly in section showing a length of metal tubing which has been turned outside-in in accordance with the invention;

Fig. 2 is a view partly in side elevation and partly broken away in section showing apparatus for producing the product of Fig. 1 by turning a metal tube outside-in while increasing its diameter;

Figs. 3, 4 and 5 are detail views in section showing the several parts of the apparatus of Fig. 2;

Figs. 6, 7 and 8 are enlarged sectional views showing different stages in the operation of the apparatus of Fig. 2;

Fig. 9 is an enlarged fragmentary section further illustrating the operation of the apparatus of Fig. 2;

The present invention relates particularly to the production of connectors to be used for the formation of hermetically sealed joints between metallic tubing of low melting point such as aluminum and of metallic tubing of substantially higher melting point, such as copper, steel or the like. Such joints are required in common practice, for example, in refrigerating and air conditioning apparatus where it is desired to form a hermetically sealed joint between aluminum tubing leading from the evaporator and copper or steel tubing leading from the condenser. Direct butt welding of such different metals involves major practical difficulties, especially because such a joint must be capable of withstanding high thermoshock, namely, rapid alternating between extremes of freezing and thawing temperatures. Since aluminum has a considerably greater coefficient of expansion than copper and steel, direct connections between tubings of these different metals appear to fail because the more rapid shrinkage of the aluminum as its temperature drops causes it to pull away from the other tube to which it is joined, and this condition is further complicated by the substantially continuous vibration to which the joints are subjected during the operation of refrigerating and air conditioning apparatus.

Figure 15:
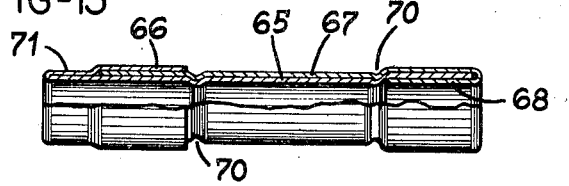
Fig. 15 is a detail view partly in side elevation and partly broken away in section showing the final product produced from the parts shown in Figs. 13 and 14.
Figure 16:
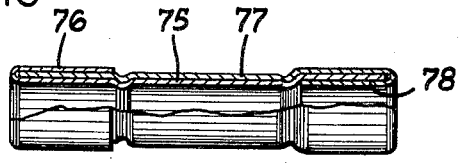
Fig. 16 is a view similar to Fig. 15 illustrating a similar product in accordance with the invention.

Referring to the drawings, which illustrate preferred embodiments of the invention, finished connectors in accordance with the invention are shown in Figs. 15 and 16, and a preferred method and apparatus for forming such connectors is illustrated somewhat diagrammatically in Figs. 1–14. One of the products for forming such connectors is shown in Fig. 1, and includes an inner cylindrical length 10 of metal tubing, an outer cylindrical length 11 of tubing of larger diameter and an integral connecting portion 12 between the tube lengths 10 and 11 which is semi-cylindrical in section. The two tube lengths 10 and 11 are coaxial and lie in telescoping relation with an annular space 13 therebetween. Tubing having these characteristics has been successfully produced in accordance with the invention from a variety of tubes having an initial diameter equal to that of either the tube length 10 or the tube length 11, and also from a variety of different metals including aluminum, copper and steel.

The tubing of the characteristics illustrated by Fig. 1 can be produced in accordance with the invention either by starting with a tube 10 of initial diameter and turning it outside-in while increasing its diameter to form the tube length 11, or by starting with a tube 11 of initial diameter and turning it outside-in while reducing the diameter to form the tube length 10. Figs. 2–9 illustrate the construction and operation of apparatus in accordance with the invention for carrying out the method of the invention to produce the product of Fig. 1 when the tube of initial diameter is to be expanded while being turned outside-in.

The main forming member in this apparatus is a punch 15 having a stem portion 16 of selected diameter to fit slidably in supporting relation within tubing of the initial diameter to be fabricated. At the base of the pilot 16 is a working face 17 having an annular groove 18 therein of semi-cylindrical section, the inner diameter of this groove being equal to the diameter of the pilot portion 16 and the inner diameter of the tubing to be fabricated. A pusher member 20 includes a cylindrical extension 21 which is of substantially the same diameter and wall thickness as the tubing to be fabricated, and this part 21 accordingly will receive the pilot portion 16 of the part 15 slidably therewithin.

A guide member 22 of annular section has its inner diameter substantially matching the outer diameter of the part 21 and the tubing to be fabricated so that it is freely slidable thereon. In its face adjacent the part 15, the guide 22 has an annular groove 23 having its inner diameter proportioned to provide a cylindrical pilot portion 25 of such wall thickness as to be substantially equal to the difference between the width of the groove 18 and twice the wall thickness of the tubing to be fabricated. The annular shoulder 26 on guide member 22 outwardly of groove 23 is proportioned for abutting engagement with the working face 17 outwardly of the groove 18 when the guide 22 is closest to the part 15. A coil spring 27 fits over the part 21 and the tubing 30 to be fabricated in order to maintain pressure urging the guide 22 toward the part 15.

Figs. 2 and 6 illustrate the relative positions of all these parts at the start of a fabricating operation on a length of tubing 30 to produce a product of the characteristics shown in Fig. 1 by turning the tubing outside-in while increasing its diameter. As shown in Fig. 6, the guide 22 is seated firmly on the working face 17 of the forming member 15 by the action of the spring 27. The leading end of the tube 30 is stopped in substantially coplanar relation with the working face 17 by engagement of its inner diameter with the inner edge of the groove 18, the portion 21 of the part 20 is at the same time held against the trailing end of the tubing 30, as by mounting in a suitable press or the like.

When the pusher part 20 is advanced from its position shown in Fig. 6, the leading end of the tube 30 will be forced to roll around the groove 18 through an initial angular extent of 180° to form a semi-cylindrical bead 31. If this move were continued in the absence of the guide 22, the tube would continue to roll around the radius of the groove 18 until its end abutted the outer wall of the tube to form a substantially complete cylindrical bead. However, this result is prevented by the pilot portion 25 of the guide 22, which intercepts the leading end of the tube after it has rolled through 180° and prevents it from moving further toward the body of the tube, as shown in Fig. 9.

As pressure on the pusher 20 is continued from the position shown in Fig. 9, the portion of the tubing 30 adjacent the bead 31 will continue to follow around the groove 18, but the leading end of the tube will be guided back along the pilot portion 25 of guide 22 to the bottom of the groove 23, and then as the forming operation continues, the guide 22 will slide back along the tubing to continue its guiding action. As a matter of fact, as soon as the leading end of the tube has been initially intercepted and prevented from continuing its curving or rolling movement by the guiding action of pilot portion 25 of guide in straightening the end portion of the tubing, further advance of the tubing by the pusher member will produce the desired turning of the tubing outside-in without the presence of the guide 22, since the leading end of the tubing will thereafter act as its own guide. As a matter of convenience, however, the guide 22 can remain as shown in Fig. 8 for retracting movement against spring 27 as the pusher member and tubing continue to advance.

Figure 10:
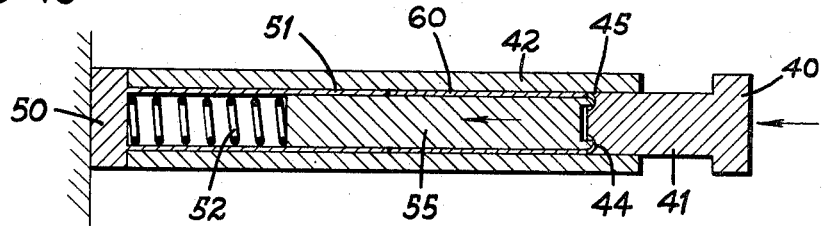
Fig. 10 is a sectional view showing apparatus for producing the product shown in Fig. 1 by turning a metal tube outside-in while decreasing its initial diameter.
Figures 11, 12:
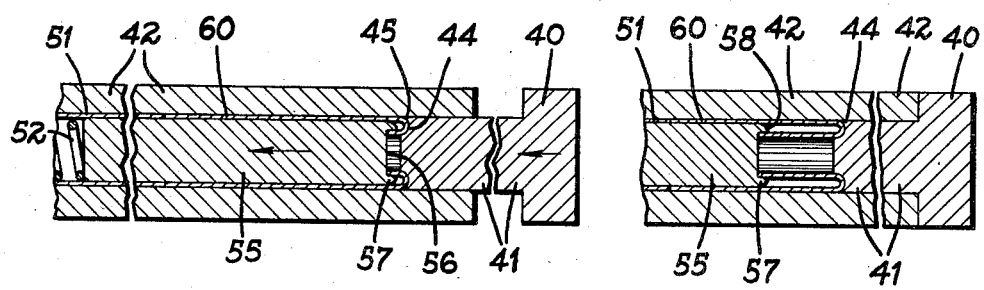
Figs. 11 and 12 are fragmentary sectional views on a larger scale illustrating the operation of the apparatus of Fig. 10.
Figures 13, 14:
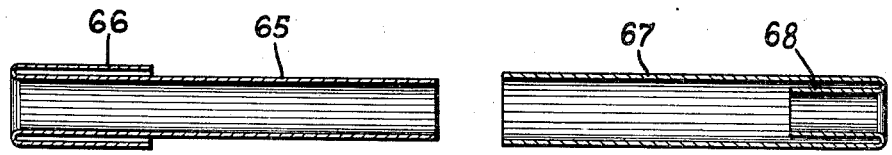
Figs. 13 and 14 are detail sectional views showing the two products produced by the apparatus of Figs. 2 and 10 for combination to form a connector as shown in Fig. 15.

Figs. 10-12 illustrate similar apparatus in accordance with the invention for forming the connector portion shown in Fig. 14. The main forming member in this apparatus is a punch 40 having a stem portion 41 of the same diameter as the outer diameter of the tubing to be fabricated, and this stem portion fits slidably within a supporting sleeve 42. The end of the stem portion 42 forms a working face having an annular groove 44 therein of semi-cylindrical section, this groove being formed to provide a feathered outer edge 45 on the stem portion 41.

A pusher member 50 includes a cylindrical extension 51 which is of substantially the same diameter and wall thickness as the tubing to be fabricated and fits slidably within the sleeve 42. Within this pusher member 50—51 is a coil spring 52 engaging the rearward end of a guide member 55 which corresponds to the guide member 22 but is of solid section and of such diameter as to fit slidably within the tubing to be fabricated. The forward end of the guide member 55 is counterbored at 56 to provide a cylindrical pilot portion 57 which corresponds with the pilot portion 25 and is of such wall thickness as to be substantially equal to the width of the groove 44 and twice the thickness of the tubing to be fabricated.

The outer edge of the pilot portion 57 is rounded about a radius as indicated at 58.

Fig. 10 illustrates the relative portions of all these parts at the start of a fabricating operation on a length of tubing 60 to produce a product of the general characteristics shown in Fig. 1 by turning the tube outside-in while decreasing its diameter. The pilot portion 57 on guide member 55 is seated in the groove 44 by the action of spring 52, and the leading end of the tubing 60 is stopped on the feathered edge 45 of the groove 44. When now pressure is applied to move the forming member and pusher member together, the leading end of the tubing will be forced to roll around the groove 44, while at the same time moving the guide member back by engagement of the end of the tube with the rounded edge 58. After the tubing has completed 180° of curling, it will enter the counterbore 56 and engage the cylindrical inner wall of the pilot portion 57. Fig. 11 shows the relative positions of these parts just after this amount of movement, and continued movement of the parts as described will cause further inward turning of the tubing as shown in Fig. 1, with the sleeve 42 and guide 55 both serving to prevent buckling or inward collapse of the tubing under the forming pressure.

The apparatus and method of the invention have been employed satisfactorily with tubings of different sizes and metals including aluminum, copper and steel, in wall thicknesses of the commonly used range of the order of 0.022 inch. It is important to note, moreover, that preferred results have been obtained with relatively hard seamless tubing, since softer tubings show a greater tendency toward buckling. At the same time, there appears to be no theoretical limit on the lengths of the tubing which may be fabricated in accordance with the invention, and long double tubes as shown in Fig. 1 offer definite practical advantages for uses such as conduits for hot or cold fluids, with the air space between the two tube sections forming an effective insulating medium.

As mentioned above, Figs. 13-16 illustrate connectors for uses such as are outlined above and which are readily produced by means of the present invention. Fig. 13 shows a length 65 of aluminum tubing which has been turned outside-in at one end to provide an integral telescoping section 66. Fig. 14 shows a length 67 of tubing of another metal such as copper which is of such outer diameter as to receive the aluminum tube 65 slidably therewithin, and which in turn is shown as having one end turned outside-in to provide an inner telescoping section 68 of such outer diameter as to fit slidably within the aluminum tubing 65.

These aluminum and copper tubes fabricated as described in connection with Figs. 2-12 are then assembled as shown in Fig. 15 until the end of the aluminum section 65 seats in the curved junction between the copper sections 67 and 68, and this portion is preferably curved about such a radius that the space between the sections 67 and 68 is not materially greater than the wall thickness of tube 65. The same is true of the sections 65 and 66 with respect to the tube 67, and preferably also the outer surface of the aluminum tube and the inner surface of the copper tube are coated with a sealing or bonding material such as solder or a silicone resin before the parts are assembled. The bonding material is heated to fuse it into sealing relation between the two tubes, and also one or more peripheral grooves 70 are provided between the turned-over ends of the two tubes for the purpose of deforming both tubes into axially interlocked relation.

Fig. 15 shows the length of the aluminum tube section 55 as of such relation to that of the copper section 67 as to leave a substantial length of the doubled aluminum tube beyond the end of the copper tube 67 in their assembled relation, and this double section of aluminum is compressed as shown at 71 in Fig. 15. This provision is particularly desirable when the aluminum end of this connector is to be welded to another length of aluminum tubing, since it assures a hermetically sealed joint. It is, however, entirely possible to proportion the two tubes in such manner that their ends seat simultaneously with each other as shown in Fig. 16, in which the aluminum sections are shown at 75 and 76 while the copper sections are indicated at 77 and 78. If the aluminum end of the connector of Fig. 16, however, is directly welded to another length of aluminum tubing, the aluminum may burn through sufficiently to expose the end of the copper tube, which may prevent the desired hermetic seal which is provided by the special construction 71 of Fig. 15, but otherwise the connector of Fig. 16 is fully comparable with that of Fig. 15. The copper end of either of these connectors may be connected by a butted or lapped joint with another length of copper tubing sealed by silver solder or other bonding material.

Connectors constructed as described in connection with Figs. 13–16 are especially resistant to thermoshock even when the two component tubes are formed of metals of such different coefficients of thermal expansion as aluminum and copper. Thus while the aluminum tubing expands more rapidly when heated, the inner section 65 will seal even more tightly against the more slowly expanding copper section 67. Conversely, when the connector is cooled, the aluminum section 66 and also the end portion of the section 65 which overlaps the copper section 68 will tend to compress the copper tubing lying therewithin as the result of the more rapid shrinkage of the aluminum, thus continuing to maintain the desired secure seal. The additional sealing material between the tubes as described may therefore for many uses serve merely as extra insurance, in view particularly of the long and tortuous passage which would necessarily have to be followed by any fluid seeking to escape from the interior of the connector.

While the methods, forms of apparatus, and articles herein described constitute preferred embodiments of the invention, it is to be understood that the invention is not limited, to these precise methods, forms of apparatus, and articles, and that changes may be made therein without departing from the scope of the invention which is defined in the appended claims.

What is claimed is:

1. A connector for joining metallic tubings of different metals comprising a first length of tubing composed of one of said metals, a portion of said first tubing being turned outside-in with respect to the body thereof and being of increased diameter with respect to said body of said first tubing, a second length of tubing composed of the other said metal, a portion of said second tubing being turned outside-in with respect to the body thereof and being of decreased diameter with respect to said second tubing body, said first tubing being of lesser diameter than said second tubing and of greater diameter than said decreased portion of said second tubing for telescoping interfitting of said lengths of tube with said first tubing seating in the junction between the two portions of said second tubing, said second tubing being of sufficient length with respect to said first tubing for the end thereof to telescope between the two portions of said first tubing, and means securing said interfitting sections of tubing together.

2. A connector for joining metallic tubings of different metals comprising a first length of tubing composed of one of said metals, a portion of said first tubing being turned outside-in with respect to the body thereof and being of increased diameter with respect to said body of said first tubing, a second length of tubing composed of the other said metal, a portion of said second tubing being turned outside-in with respect to the body thereof and being of decreased diameter with respect to said second tubing body, said first tubing being of lesser diameter than said second tubing and of greater diameter than said decreased portion of said second tubing for telescoping interfitting of said lengths of tube with said first tubing seating in the junction between the two portions of said second tubing, said second tubing being of sufficient length with respect to said first tubing for the end thereof to telescope between the two portions of said first tubing, and said interfitted portions of tubing having therein at least one circumferential groove pressed into the outer surface thereof and deformed said portions into axially interlocked relation.

3. A connector for joining aluminum tubing to tubing of another metal having a substantially higher melting point, comprising a length of aluminum tube having a portion thereof turned outside-in with respect to the body thereof and of increased diameter with respect to said body, a second length of tube composed of the other said metal and having a portion thereof turned outside-in with respect to the body thereof and of decreased diameter with respect to said second tube body, said aluminum tube being of lesser diameter than said second tube and of greater diameter than said decreased portion of said second tube for telescoping interfitting of said tubes with said aluminum tube seating in the junction between the two portions of said second tube, said second tube being of sufficient length with respect to said first tube for the end thereof to telescope between the two portions of said first tube, said aluminum tube being of greater length than said second tube to provide a double portion thereof beyond the end of said second tube for direct welding to another length of aluminum tubing, and means securing said tubes together.

References Cited in the file of this patent

UNITED STATES PATENTS

| | | |
|---|---|---|
| 1,728,410 | Hothersall | Sept. 17, 1929 |
| 1,967,192 | Mungen | July 17, 1934 |
| 2,247,420 | Sylvester | July 1, 1941 |
| 2,284,754 | McGarry | June 2, 1942 |
| 2,449,247 | Paucek | Sept. 14, 1948 |
| 2,479,755 | Martin | Aug. 23, 1949 |